United States Patent
Houde et al.

(10) Patent No.: US 9,608,507 B2
(45) Date of Patent: Mar. 28, 2017

(54) LOW POWER AND LOW EMI POWER STEALING CIRCUIT FOR A CONTROL DEVICE

(71) Applicant: SINOPE TECHNOLOGIES INC. INC., Saint-Jean-sur-Richelieu (CA)

(72) Inventors: Francois Houde, Mont-Saint-Gregoire (CA); Sylvain Mayer, Saint-Jean-sur-Richelieu (CA); Samuel Marcoux-Houde, Saint-Jean-sur-Richelieu (CA)

(73) Assignee: SINOPE TECHNOLOGIES INC., Saint-Jean-sur-Richelieu (CA)

( * ) Notice: Subject to any disclaimer, the term of this patent is extended or adjusted under 35 U.S.C. 154(b) by 936 days.

(21) Appl. No.: 13/918,336

(22) Filed: Jun. 14, 2013

(65) Prior Publication Data

US 2014/0368036 A1   Dec. 18, 2014

(51) Int. Cl.
*H02M 1/08* (2006.01)
*H02M 1/00* (2006.01)

(52) U.S. Cl.
CPC ...... *H02M 1/08* (2013.01); *H02M 2001/0006* (2013.01); *Y10T 307/406* (2015.04); *Y10T 307/461* (2015.04)

(58) Field of Classification Search
CPC .................. H02M 1/08; H02M 2001/0006
See application file for complete search history.

(56) References Cited

U.S. PATENT DOCUMENTS

| | | |
|---|---|---|
| 3,633,095 A | 1/1972 | Hood |
| 4,270,058 A | 5/1981 | Schornack |
| 4,728,866 A | 3/1988 | Capewell et al. |
| 4,776,514 A | 10/1988 | Johnstone et al. |
| 4,829,457 A | 5/1989 | Russo et al. |
| 4,955,069 A | 9/1990 | Ionescu |

(Continued)

FOREIGN PATENT DOCUMENTS

EP    1406374    4/2004

OTHER PUBLICATIONS

Fairchild Semiconductor Corporation, "Applications of Zero Voltage Crossing Optically Isaloated Triac Drivers", REV. 4.00, AN-3004, 2002.

(Continued)

*Primary Examiner* — Thienvu Tran
*Assistant Examiner* — Pinping Sun
(74) *Attorney, Agent, or Firm* — Norton Rose Fulbright Canada LLP

(57) ABSTRACT

There is provided a device and a method for controlling a supply of power from an AC power source to a load. A switch is arranged in series electrical connection between the power source and the load, the switch having a first state in which the switch connects the load to the power source for supplying an electrical current from the power source to the load and a second state in which the switch disconnects the load from the power source. A power stealing circuit is arranged in parallel electrical connection to the switch and adapted to divert the electrical current away from the power source with the switch in the second state, the power stealing circuit comprising a linear semiconductor device adapted to control a rate of change of a first voltage across terminals of the switch upon the switch being brought to the first state.

23 Claims, 7 Drawing Sheets

(56) References Cited

U.S. PATENT DOCUMENTS

| | | |
|---|---|---|
| 4,965,509 A | 10/1990 | Oldham |
| 5,122,724 A | 6/1992 | Criss |
| 5,304,781 A | 4/1994 | Stalsberg |
| 5,323,062 A | 6/1994 | Crawford et al. |
| 5,505,377 A | 4/1996 | Weiss |
| 5,736,795 A | 4/1998 | Zuehlke et al. |
| 5,754,036 A | 5/1998 | Walker |
| 5,847,555 A | 12/1998 | Lewis |
| 5,903,139 A | 5/1999 | Kompelien |
| 6,185,082 B1 | 2/2001 | Yang |
| 6,329,785 B1 | 12/2001 | Starkie et al. |
| 6,356,038 B2 | 3/2002 | Bishel |
| 6,400,119 B1 | 6/2002 | Garza et al. |
| 6,474,979 B1 | 11/2002 | Rippelmeyer |
| 6,490,174 B1 | 12/2002 | Kompelien |
| 6,700,333 B1 | 3/2004 | Hirshi et al. |
| 6,943,510 B2 | 9/2005 | Gorti |
| 7,240,851 B2 | 7/2007 | Walsh |
| 7,339,331 B2 | 3/2008 | Vanderzon |
| 7,476,988 B2 | 1/2009 | Mulhouse et al. |
| 7,595,613 B2 | 9/2009 | Thompson et al. |
| 7,656,103 B2 | 2/2010 | Shteynberg et al. |
| 7,755,220 B2 * | 7/2010 | Sorg ................... H02M 5/2576 307/125 |
| 8,085,010 B2 | 12/2011 | Lumsden |
| 8,102,167 B2 | 1/2012 | Irissou et al. |
| 8,110,945 B2 | 2/2012 | Simard et al. |
| 8,212,494 B2 | 7/2012 | Veltman |
| 8,294,379 B2 | 10/2012 | Liu et al. |
| 8,310,171 B2 | 11/2012 | Reisenauer et al. |
| 8,373,547 B2 | 2/2013 | Benya et al. |
| 8,390,214 B2 | 3/2013 | Van Laanen et al. |
| 9,405,303 B2 * | 8/2016 | Zikes ................. G05D 23/1905 |
| 2005/0168896 A1 | 8/2005 | Vanderzon |
| 2007/0114848 A1 * | 5/2007 | Mulhouse ................. H02J 7/34 307/43 |
| 2008/0218148 A1 | 9/2008 | Robertson et al. |
| 2010/0019052 A1 | 1/2010 | Yip |
| 2010/0090618 A1 | 4/2010 | Veltman |
| 2011/0102052 A1 | 5/2011 | Billingsley et al. |
| 2011/0182094 A1 | 7/2011 | Lumsden et al. |
| 2011/0248640 A1 | 10/2011 | Welten |
| 2012/0155137 A1 * | 6/2012 | Simard ............... H02M 5/2573 363/126 |
| 2012/0256009 A1 * | 10/2012 | Mucignat ........... G05D 23/1905 236/1 C |
| 2013/0010018 A1 | 1/2013 | Economy |
| 2013/0026947 A1 | 1/2013 | Economy et al. |
| 2013/0030589 A1 | 1/2013 | Pessina et al. |

OTHER PUBLICATIONS

Nigim et al., "Power Quality Improvement Using Integral-PWM Control in an AC/AC Voltage Converter", Elsevier Science B.V., Electric Power Systems Research vol. 63, p. 65-71, 2002.

* cited by examiner

LOW POWER AND LOW EMI POWER STEALING CIRCUIT FOR A CONTROL DEVICE

TECHNICAL FIELD

The present invention relates to the field of power stealing circuits for control devices.

BACKGROUND OF THE ART

Control devices, e.g. two-wire line voltage electronic thermostats, are commonly used to control the operation of electric heating systems, such as baseboard heaters, radiant floors, radiant ceilings, convectors, or the like. Such thermostats may comprise a triode alternating current switch (or TRIAC) placed in series with a load (e.g. the heating system) for controlling the current flowing in the load. In response to an input, the circuit is closed to connect the load to an alternating current (AC) power source. This leads to a voltage drop across the terminals of the thermostat. However, it is desirable for the thermostat to remain operational while the load is being fed. Thus, in order to operate the thermostat, there is a need for some of the source's power to be diverted by the internal circuitry of the thermostat, and this without disturbing the load.

For this purpose, a common technique is to delay the triggering of the TRIAC so that the voltage generated across the terminals is stored in an accumulator. Once the accumulated energy is sufficient to operate the thermostat's internal circuitry for the remaining cycle time, the TRIAC is triggered. A disadvantage of this technique is that the higher the power required by the thermostat's internal circuitry, the longer the TRIAC triggering delay for ensuring that sufficient energy is accumulated, the higher the voltage across the TRIAC at the time of commutation, and the higher the voltage rate of change (dv/dt), the harmonics, and the EMI generated on the power line. Although such interference may be eliminated using passive filters for small loads, this may not prove suitable for large loads as bulky windings and capacitors would be required.

This is especially true for modern thermostats, which are provided with radiofrequency (RF) communication functionalities that come with increased power requirements.

There is therefore a need for an improved power stealing circuit for a control device.

SUMMARY

In accordance with a first broad aspect, there is provided a control device for controlling a supply of power from an AC power source to a load, the control device comprising a switch arranged in series electrical connection between the power source and the load, the switch having a first state in which the switch connects the load to the power source for supplying an electrical current from the power source to the load and a second state in which the switch disconnects the load from the power source, and a power stealing circuit arranged in parallel electrical connection to the switch and adapted to divert the electrical current away from the power source with the switch in the second state, the power stealing circuit comprising a linear semiconductor device adapted to control a rate of change of a first voltage across terminals of the switch upon the switch being brought to the first state.

In accordance with a second broad aspect, there is provided a power stealing circuit for a control device controlling a supply of power from an AC power source to a load, the control device comprising a first switch having a first state in which the first switch connects the load to the power source for supplying an electrical current from the power source to the load and a second state in which the first switch disconnects the load from the power source. The power stealing circuit comprises a second switch arranged in parallel electrical connection with the first switch for diverting the electrical current away from the power source with the first switch in the second state, a charge storage device coupled to the second switch and adapted to store therein an electrical charge when the electrical current is diverted away from the power source, and a linear semiconductor device arranged in parallel electrical connection with the first switch and adapted to control a rate of change of a first voltage across terminals of the first switch upon the first switch being brought to the first state.

In accordance with a third broad aspect, there is provided a method for controlling a supply of power from an AC power source to a load, the method comprising diverting an electrical current away from the power source, storing an electrical charge in a charge storage device upon the electrical current being diverted away from the power source, comparing a voltage across terminals of the charge storage device to a threshold value, if the voltage reaches the threshold value, outputting a control signal for activating a linear semiconductor device, the linear semiconductor device, when activated, controllably lowering a line voltage supplied by the power source towards zero volts, and applying when the line voltage approaches zero volts a first pulse on a gate terminal of a switch arranged in series electrical connection between the power source and the load to trigger the switch.

In accordance with a fourth broad aspect, there is provided a two-wire line voltage thermostat for controlling a supply of power from an AC power source to a load, the thermostat comprising a switch arranged in series electrical connection between the power source and the load, the switch having a first state in which the switch connects the load to the power source for supplying an electrical current from the power source to the load and a second state in which the switch disconnects the load from the power source, a power stealing circuit arranged in parallel electrical connection to the switch and adapted to divert the electrical current away from the power source with the switch in the second state, the power stealing circuit comprising a linear semiconductor device adapted to control a rate of change of a first voltage across terminals of the switch upon the switch being brought to the first state, and a communications module adapted to receive one or more input radio-frequency signals indicative of instructions to operate at least one of the load and the thermostat.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
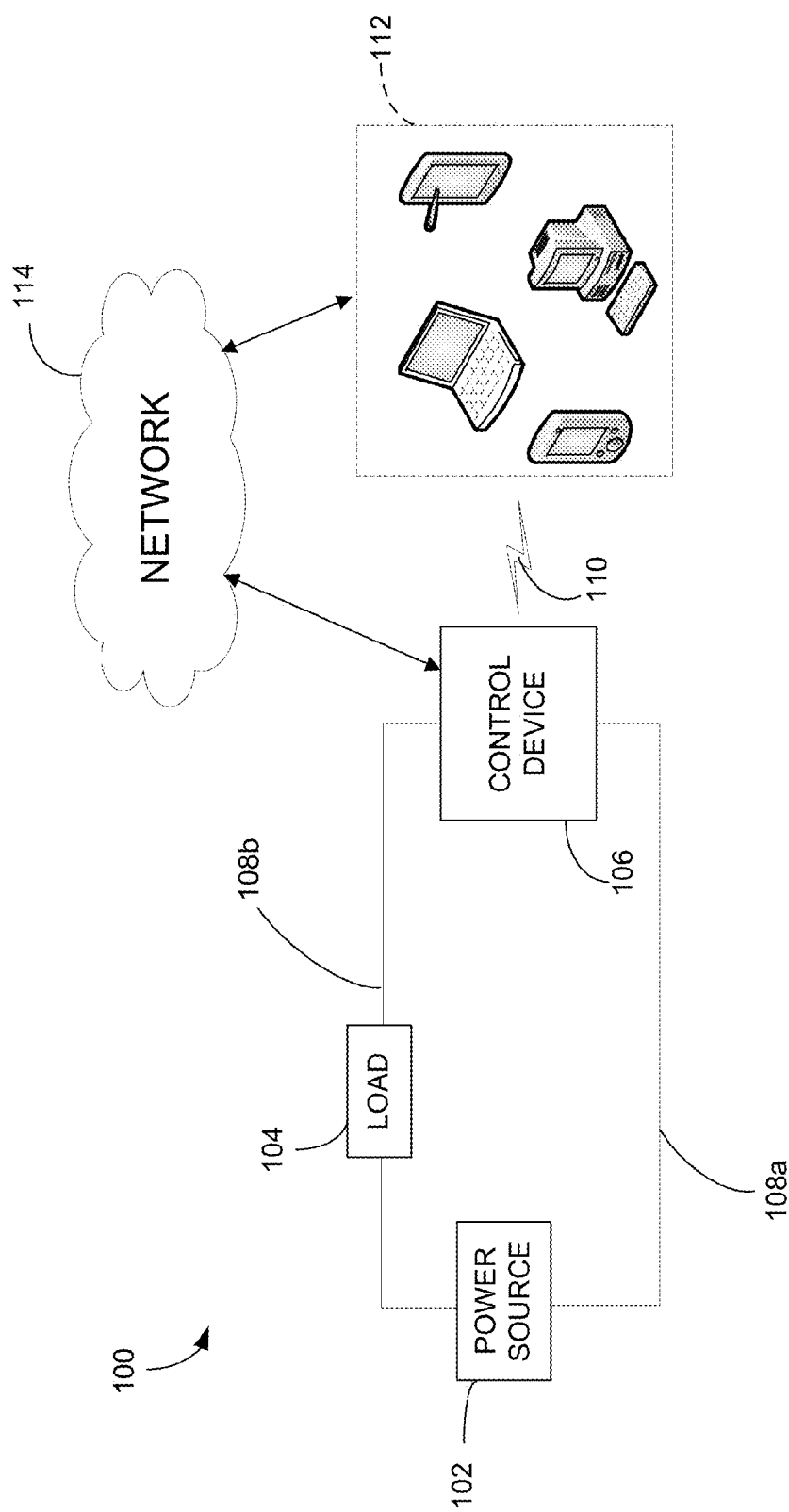
FIG. 1 is a schematic diagram of a system for controlling a supply of power to a load, in accordance with an illustrative embodiment of the present invention.

Referring now to FIG. 1, a system 100 for controlling a supply of power to a load will now be described. The system 100 comprises a power source 102, a load 104, and a control device 106 coupled in series electrical connection. As will be discussed further below, the control device 106 may be used to control the power supplied to the load 104 by the power source 102, in turn controlling activation of the load 104. For this purpose, a first terminal (not shown) of the control device 106 is coupled to one side of the voltage from the power source 102 via an input line 108a. This allows the control device 106 to receive the supply voltage from the power source 102. A second terminal (not shown) of the control device 106 is in turn coupled to the load 104 via an output line 108b. The supply voltage received from the power source 102 can then be supplied by the control device 106 to the load 104.

The power source 102 may be an alternating current (AC) power source providing a sinusoidal electrical signal having a number of repeating cycles. In one embodiment, the power source 102 provides a line voltage of 240 volts at 60 Hz. In this case, the power source 102 may include two (2) or more wires (not shown), with one wire being a line voltage and a second wire being line or neutral. Other configurations may apply. It should also be understood that the power source may supply any other suitable voltage and/or frequency, e.g. 120 volts at 60 Hz.

The load 104 may comprise any suitable device. For example, the load 104 may be an electric heating element, such as a baseboard heater, a radiant floor, a radiant ceiling, a convector, or the like, having a load up to 4000W. It should however be understood that other loads, such as air conditioning units or ventilators, may also apply. In embodiments where the load 104 is a heating element, the control device 106 may be a two-wire line voltage thermostat adjusted to a given temperature setpoint. When the ambient temperature in a space where the load 104, i.e. the heating element, is installed reaches the temperature setpoint, the control device 106 prevents power from being supplied to the load 104, thereby turning off the load 104. The control device 106 then continues to monitor the ambient temperature in the space. When the temperature drops below the temperature setpoint, the control device 106 allows power to be supplied to the load 104. Thus, the load 104 is turned on and this until the desired temperature setpoint is achieved.

In one embodiment, the control device 106 is a two-wire line voltage thermostat that communicates through radio-frequency (RF) signals 110 with one or more remote user devices 112. The user devices 112 may be positioned in proximity with (e.g. within the same room) or be remote from the control device 106. For this purpose, a suitable RF communication protocol, such as ZigBee™, WiFi™, Z-wave™, IPv6 over Low power Wireless Personal Area Networks (6LowPAN), Radio Data System (RDS), proprietary protocol, or the like, may be used. The control device 106 may then be provided with a suitable communications module, such as an RF transceiver and an antenna for transmitting and receiving the RF signals 110 (not shown). The user devices 112 may further comprise any device, such as a computer, e.g. a laptop or a desktop computer, a tablet device, a personal digital assistant (PDA), a smartphone, a television, or the like, having RF communication capabilities. The user devices 112 and the control device 106 may communicate the RF signals 110 either directly or via a network 114, such as the Internet, a cellular network, or others known to those skilled in the art. As such, the user devices 112 may comprise any device adapted to communicate over the network 114 and the communication module of the control device 106 may be adapted for communication over the network 114.

The RF signals 110 received at the control device 106 from one or more user devices 112 may comprise commands to operate, e.g. activate, deactivate, change the settings or otherwise program, the control device 106. For example, the RF signals 110 may comprise a command for the control device 106 to sense or adjust the temperature in the space where the load 104 is installed. The RF signals 110 may comprise control instructions including settings of the control device 106, which are pre-configured at manufacture or via an update. Alternatively, the RF signals 110 may comprise control instructions to program settings, e.g. operating parameters, of the control device 106. The RF signals 110 may also comprise commands for operating the load 104. For instance, the commands may be for activating or deactivating the load 104, e.g. a heating element.

RF signals as in 110 may further be sent from the control device 106 to the user device 112. Such signals 110 may comprise relevant information, such as temperature readings, warnings, and the like, indicative of operating conditions of the control device 106 and/or the controlled load 104. For example, upon the control device 106 receiving from the user device(s) 112 the command to adjust the temperature in the space, the control device 106 may act accordingly. Once the desired temperature is achieved, the control device 106 may output to the user device(s) 112 having requested the temperature adjustment RF signals 110 indicative that the adjustment has been effected. It should be understood that the RF signals 110 may be used to control a variety of functionalities of the control device 106 as well as to provide additional functionalities thereto.

Figure 2:
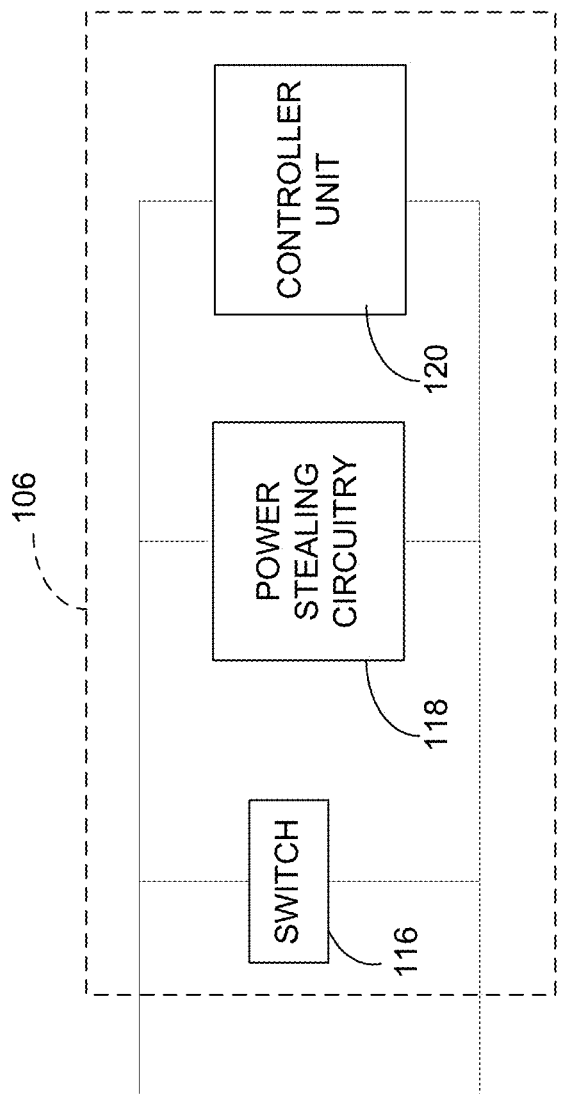
FIG. 2 is a schematic diagram of the control device of FIG. 1.
Figure 3:
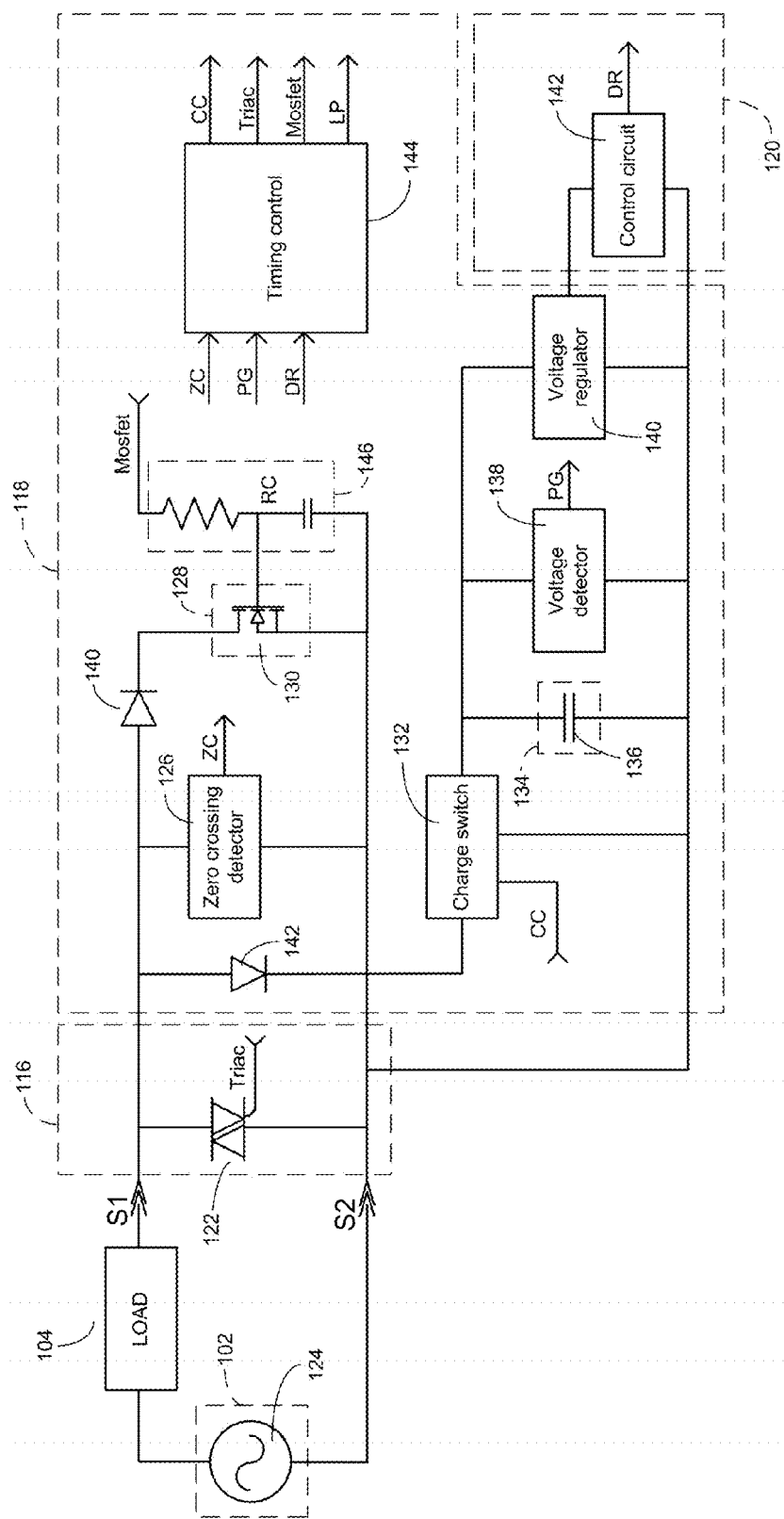
FIG. 3 is a schematic diagram of the power stealing circuit and of the controller unit of FIG. 2.

Referring to FIG. 2 and FIG. 3, the control device 106, e.g. the two-wire line voltage thermostat, illustratively comprises a switch 116, power stealing circuitry 118, and a controller unit 120 coupled in parallel electrical connection with one another. The switch 116 illustratively has an "on" state or closed position, in which the load 104 is connected to the power source 102 so that current from the power source 102 passes trough the load 104. The switch 116 further has an "off" state or opened position, in which the load 104 is disconnected from the power source 102 so that current from the power source 102 is prevented from passing trough the load 104. The switch 116 may be controlled between the "on" and "off" states by the power stealing circuit 118 supplying a corresponding control signal to the switch 116.

As shown in FIG. 3, the switch 116 may comprise a triode alternating current switch (or TRIAC) 122 having a gate terminal, a first anode terminal, and a second anode terminal (not shown). Still, although a TRIAC 122 is described herein for illustrative purposes, it should be understood that other types of switching devices, such as a relay contact, a solid state switch contact, or the like, may apply. As known to those skilled in the art, a pulse may be supplied to the gate of the TRIAC 122 in order to cause the latter to be triggered. As a result, the TRIAC 122 may conduct on both halves of a sinusoidal electrical signal, such as the AC waveform produced by the power source 102 (illustrated as an AC power supply 124 in FIG. 3).

The TRIAC 122 may be triggered into conduction by either a positive or negative gate voltage. In particular, the TRIAC 122 may be triggered in one of four (4) quadrants of operation according to the voltage on the gate and the second anode terminal with respect to the first anode terminal. Also, in one embodiment, triggering of the TRIAC 122 is delayed at each cycle of the sinusoidal electrical signal supplied by the power source 102 so as to enable voltage to rise across terminals of the TRIAC 122 prior to triggering thereof.

Still referring to FIG. 3, the power stealing circuitry 118 enables the controller unit 120 to be operated even after the TRIAC 122 has been triggered and a voltage drop has occurred across the terminals of the control device 106. For this purpose and as will be discussed further below, the power stealing circuitry 118 may be used to divert from the power source 102 an amount of power sufficient to provide operating power to the controller unit 120 without impairing operation of the load 104.

The power stealing circuit 118 illustratively comprises a zero crossing detector 126 and a linear semiconductor device 128, such as a linear metal-oxide-semiconductor field-effect transistor (MOSFET) 130, an Insulated Gate Bipolar Transistor (IGBT), a Bipolar Junction Transistor (BJT), or any other suitable device, connected in parallel with the TRIAC 122. The power stealing circuit 112 further comprises a charge switch 132 and a charge storage device 134, such as a capacitor 136. Although a capacitor 136 is shown for illustrative purposes, it should be understood that the charge storage device 134 may comprise any other suitable charge storage device, such as a rechargeable battery, or the like, may apply. A voltage detector 138 and a voltage regulator 140 may further be connected in parallel with the charge storage device 134.

The controller unit 120 illustratively comprises a control circuit 142 coupled to the voltage regulator 140. Although not illustrated, it should be understood that the controller unit 120 may further comprise a communications module (not shown) for enabling RF communication between the control device 106 and the user devices (reference 112 in FIG. 1), as discussed above with reference to FIG. 1. The controller unit 120 may comprise a microprocessor, a microcontroller, logic gates, a programmable logic device (PLD), a field-programmable gate array (FPGA), or any other suitable processing means (not shown) known to those skilled in the art. As will be discussed further below, the control circuit 142 illustratively outputs one or more control signals to a timing control unit 144, which may be separate from or integrated with the control circuit 142.

In operation, at each new cycle of the sinusoidal electrical signal provided by the power source 102, the zero crossing detector 126 monitors the line voltage to detect when the latter is at or near a zero volt line, also referred to as "zero crossing". Once the zero crossing is detected, the zero crossing detector 126 outputs a corresponding "Zero Crossing" signal (referred to as "ZC" signal) to the timing control unit 144. Upon receiving the ZC signal, the timing control unit 144 then outputs a control signal (referred to as "CC" drive signal) to the charge switch 132 to cause the latter to move from an open position to a closed position. As the charge switch 132 is connected in parallel with the TRIAC 122, electrical current supplied by the source 102 is diverted away from the latter upon the charge switch 132 closing. In addition, an electrical charge accumulates in the charge storage device 134. The charge stored in the charge storage device 134 is in turn transferred via the voltage regulator 140 to the control circuit 142 for energizing the latter. In particular, the voltage regulator 140 may furnish the required operating voltage to the control circuit 142.

The CC drive signal may be output by the timing control unit 144 as a linear, always "on" signal that causes the charge switch 132 to remain closed for the entire duration of the AC cycle. As a result, power is diverted from the power source 102 throughout the whole cycle. Alternatively, the timing control unit 144 may output an intermittent "on/off" CC drive signal, which causes the charge switch 132 to only close for a given portion of the AC cycle and remain open for the remainder of the cycle. In the latter case, power is diverted from the power source 102 for the given portion of the AC cycle only.

The voltage across the charge storage device 134 is further monitored by the voltage detector 138 and compared to a predetermined threshold level. When the voltage detector 138 detects that the voltage across the charge storage device 134 has reached the threshold level, the voltage detector 138 outputs a validation signal (referred to as "Power Good" or "PG" signal) to the timing control unit 144. Upon receiving the PG signal, the timing control unit 144 outputs a "Mosfet" control signal for causing the diverted electrical current to be transferred through the MOSFET 130 for activating the latter. The MOSFET 130 is illustratively designed so as to controllably lower the line voltage towards zero volts with a predetermined rate. The predetermined rate may be a function of the time constant of the resistor-capacitor (RC) network 146 of the driver circuit (not shown) of the MOSFET 130. The rate may be controlled using any suitable technique or device. In one embodiment, a processor may be used. An AC/DC converter may also apply.

Once the voltage across the MOSFET 130, and accordingly that across the TRIAC 122, approaches zero volts, the timing control unit 144 outputs a first "Triac" control signal to cause a pulse to be applied on the gate terminal of the TRIAC 122 for triggering the TRIAC 122. Upon being triggered, the TRIAC 122 is brought into a conducting state and the load current is transferred from the MOSFET 130 to the TRIAC 122. As the MOSFET 130 controllably lowered the level of the line voltage towards zero volts prior to the TRIAC 122 being triggered, the voltage across terminals of the TRIAC 122 is already close to the conduction voltage of the TRIAC 122 when the latter starts conducting. As a result, the voltage drop (dv/dt) across the terminals of the TRIAC 122 is not significant. The harmonics and EMI resulting from triggering the TRIAC 122 can therefore be reduced. In particular, it becomes possible to ensure that the EMI generated by the control device 106 does not exceed regulated EMI emission levels, such as levels indicated in the U.S. Federal Communications Commission (FCC) regulations.

As known to those skilled in the art, the conducting state of the TRIAC 122 can be maintained after the TRIAC 122 has been triggered as long as the current flowing between the first and the second anode terminals does not fall below a threshold level (also referred to as a holding current) determined according to the operating parameters of the TRIAC 122. Typically, a half-cycle after the zero-crossing of the line voltage, the voltage across the terminals of the TRIAC 122 approaches zero volts and the current flowing between the terminals of the TRIAC 122 is not sufficient to maintain conduction, causing the TRIAC 122 to stop conducting and switch to its "off" state. In order to maintain conduction of the TRIAC 122, the timing control unit 144 illustratively outputs to the TRIAC 122 a second "Triac" control signal about a half-cycle (e.g. about 8.33 ms at 60 Hz) after the zero crossing detector 126 detects the zero-crossing of the line voltage.

This second "Triac" control signal causes a pulse to be applied on the gate terminal of the TRIAC 122. In particular, the second "Triac" control signal causes the pulse to send a current on the gate terminal of the TRIAC 122 to maintain conduction thereof. Conduction of the TRIAC 122 may indeed be lost when the current flowing through the anodes of the TRIAC 122 has fallen below the holding current. Also, the timing control unit 144 illustratively generates the second "Triac" control signal so that the width of the second pulse ensures that the timing of the second pulse covers the time periods where the holding current of the TRIAC 122 would be insufficient to maintain the conduction of the TRIAC 122. In particular, the second pulse is applied to the gate terminal of the TRIAC 122 shortly before and after the half-cycle following the zero-crossing of the line voltage. In this manner, it can be ensured that the second pulse is applied before the TRIAC 122 loses its holding current and the TRIAC 122 is therefore prevented from losing conduction.

The energy accumulated in the charge storage device 134 is illustratively used to apply a pulse on the gate terminal of the TRIAC 122 at each half cycle. By synchronizing such pulses with the zero crossing of the line voltage rather than applying pulses on the gate terminal continuously, the amount of energy needed to maintain conduction of the TRIAC 122, and accordingly the amount of energy that needs to be accumulated in the charge storage device 134, can be reduced. Thus, a reduction in the size and the charging time of the charge storage device 134 can be achieved. The triggering delay of the TRIAC 122, and thus the voltage rate of change (dv/dt) across the terminals thereof, can then be decreased, thereby reducing harmonics and EMI. In addition, by using the energy stored in the charge storage device 134 rather than energy from the line voltage to generate the pulse for maintaining conduction of the TRIAC 122, power cuts and interferences, which result from the zero-crossing of the line voltage, can be avoided. The conduction of the TRIAC 122 can therefore always be maintained regardless of the line voltage output by the power source 102.

Still referring to FIG. 3, as the load 104 is connected in series with the control device (reference 106 in FIG. 2) and the current that causes the charge storage device 134 to store the diverted power is limited by the resistance of the load 104, the rate of charge, and accordingly the charging time, of the charge storage device 134 depends on the load 104. As such, the timing control unit 144 can determine from the charging time of the charge storage device 134 the power consumed by the load 104 connected to the control device 106. In one embodiment, the charging time is measured using a timer (not shown) that is started when the zero crossing of the line voltage is initially detected by the zero crossing detector 126. The timer is stopped when the voltage across the charge storage device 134 has reached the threshold value. On the basis of the charging time measurement, the timing control unit 144 then outputs an "LP" signal indicative of the power consumption of the load 104. The power consumption (LP signal) determined by the timing control unit 144 can be output to the user devices (reference 112 in FIG. 1) using any suitable means, such as the RF communication signals (reference 110 in FIG. 1). The information may also be output via a suitable output device, such as a display (not shown), provided on the control device 106.

Figure 4:
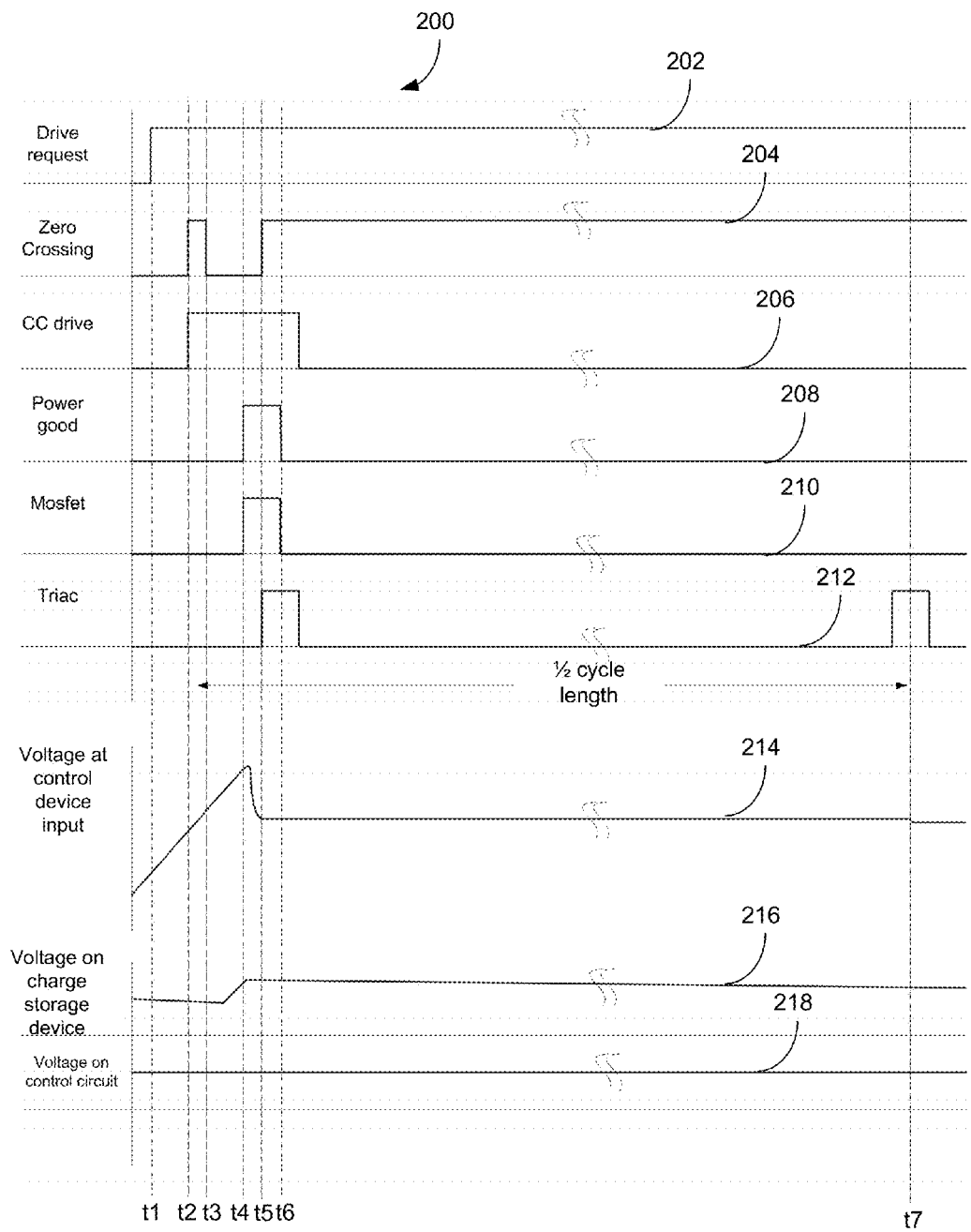
FIG. 4 illustrates a timing sequence for triggering the TRIAC of FIG. 3 when an activation command is received at the control device of FIG. 1.

FIG. 4 illustrates a timing sequence 200 for triggering the TRIAC 122 when an activation command, such as a demand for heating a space, is received at the control device 106. As discussed above, the chronology of the triggering sequence 200 may be generated by the timing control unit 144. As shown in FIG. 4, receipt of the command causes a "Drive request" ("DR") signal 202 to be activated at time t1 to indicate to the timing control unit 144 that a request for activating the load (reference 104 in FIG. 3) has been received. As discussed above, the zero crossing of the line voltage is then detected at time t2 as seen in plot 204 when the line voltage across the terminals S1 and S2 of FIG. 3 approaches zero volts. The CC drive signal 206 is then activated at time t2 to cause the charge switch (reference 132 in FIG. 3) to close so that power is diverted from the power source 102 to the charge storage device (reference 134 in FIG. 3).

The Zero Crossing signal 204 then returns inactive to zero at time t3 because the line voltage across the terminals S1 and S2 of FIG. 3 is rising and moves away from zero volts. Some time after, i.e. at time t4, the Power Good signal 208 is activated to indicate that the power accumulated in the charge storage device 134 has reached the predetermined level discussed above. At the same time, the Mosfet signal 210 is activated so that the MOSFET (reference 130 in FIG. 3) drags the line voltage to zero volts. The time required by the MOSFET 130 to drag the line voltage towards zero volts depends on the time constant of the RC network (reference 146 in FIG. 3) of the MOSFET driver circuit. In one embodiment, the MOSFET 130 causes the line voltage to approach zero volts in about 100 ns. At time t5, the line voltage is thus close to zero volts. Zero crossing of the line voltage is therefore detected and the Zero Crossing signal 204 is activated once more and this until the end of the cycle. Then, the Triac signal 212 is activated, resulting in a pulse being applied on the gate terminal of the TRIAC (reference 122 in FIG. 3) for triggering the latter. At time t6, after the Triac signal 212 has been activated, triggering of the TRIAC 122 causes the load current, which was flowing in the MOSFET 130 to be transferred to the TRIAC 122 and flows therein.

As discussed above, the Triac signal 212 is activated again at time t7 in order to cause a pulse to be applied on the gate terminal of the TRIAC 122, thereby maintaining conduction of the TRIAC 122. In particular, the Triac signal 212 is activated a half-cycle after the Zero Crossing signal 204 has been activated, i.e. after the zero crossing of the line voltage has been detected.

Still referring to FIG. 4, plot 214 illustrates the voltage at the input of the control device (reference 106 in FIG. 1). It can be seen that this voltage steadily increases until time t4 when the Mosfet signal 210 is activated and the MOSFET 130 enters in conduction mode. As of time t4, the voltage at the input of the control device 106 drops until it reaches close to zero volts at time t5 when the line voltage is dragged to zero by the MOSFET 130 being triggered, as discussed above.

Plot 216 of FIG. 4 further illustrates the voltage accumulated on the charge storage device (reference 134 in FIG. 3). The plot 216 shows that the voltage increases until it reaches at time t4 the predetermined level discussed with reference to FIG. 3. As discussed above, the Power Good signal 208 is also activated at time t4 to indicate that the charge storage device 134 has accumulated the desired amount of energy.

Plot 218 of FIG. 4 further illustrates the voltage on the control circuit 142. It can be seen that using the power stealing circuitry (reference 118 in FIG. 2), the control circuit voltage does not drop and remains at a level sufficient for operating the thermostat's internal circuitry.

Figure 5:
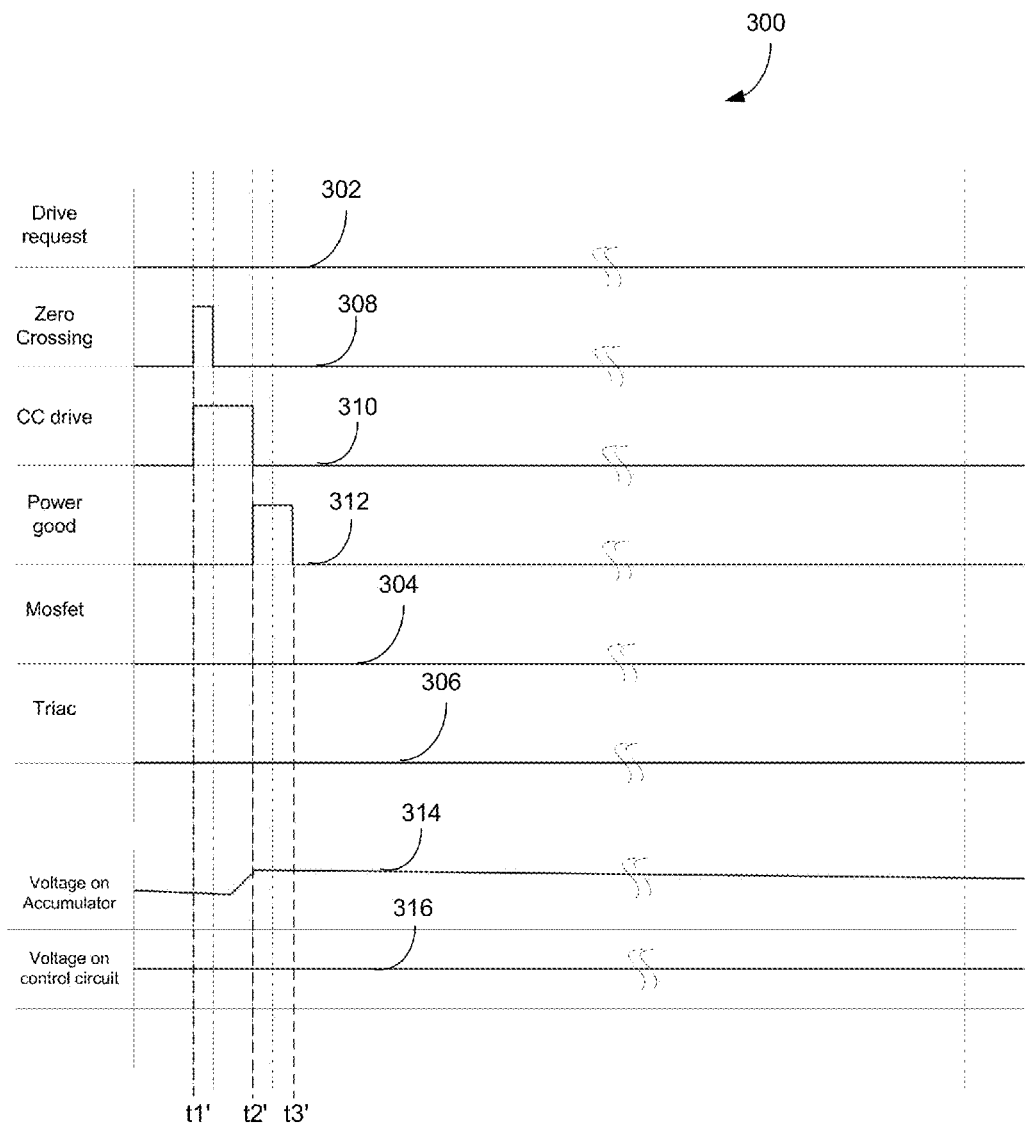
FIG. 5 illustrates a timing sequence 200 for powering the control device of FIG. 1 when no activation command is received.

FIG. 5 illustrates a timing sequence 300 generated by the power stealing circuit (reference 118 in FIG. 2) for powering the control device (reference 106 in FIG. 2) when no activation command is received at the control device 106. As seen in FIG. 5, the Drive request signal 302, the Mosfet signal 304, and the Triac signal 306 remain deactivated as no activation command, e.g. no heating demand, has been received. At time t1', upon the zero crossing detector (reference 126 in FIG. 3) detecting zero crossing of the line voltage, the Zero Crossing signal 308 is activated. Then, the CC drive signal 310 is activated at the beginning of the cycle in order to ensure that power is only diverted from the power source (reference 102 in FIG. 1) early in the cycle for powering the controller unit 120. At time t2', once the charge accumulated in the charge storage device (reference 134 in FIG. 3) has reached the desired level, the Power Good signal 312 is activated and the CC drive signal 310 is deactivated to deactivate the charge switch (reference 132 in FIG. 3). The Power Good signal 312 is then deactivated at time t3'. By deactivating the CC drive signal 310 when sufficient power has been accumulated in the charge storage device 134, power dissipation and overheating of the charge switch 132 can be prevented. The process is then repeated at the beginning of each cycle upon detection of the zero crossing and activation of both the Zero Crossing signal 310 and the CC drive signal 308.

Plot 314 of FIG. 5 further illustrates the voltage accumulated on the charge storage device (reference 134 in FIG. 3). The plot 314 shows that the voltage increases until it reaches at time t2' the predetermined level discussed above. Plot 316 illustrates the voltage on the control circuit 142. It can be seen that using the power stealing circuitry (reference 118 in FIG. 2), the control circuit voltage does not drop and remains at a level sufficient for operating the thermostat's internal circuitry.

Figure 6:
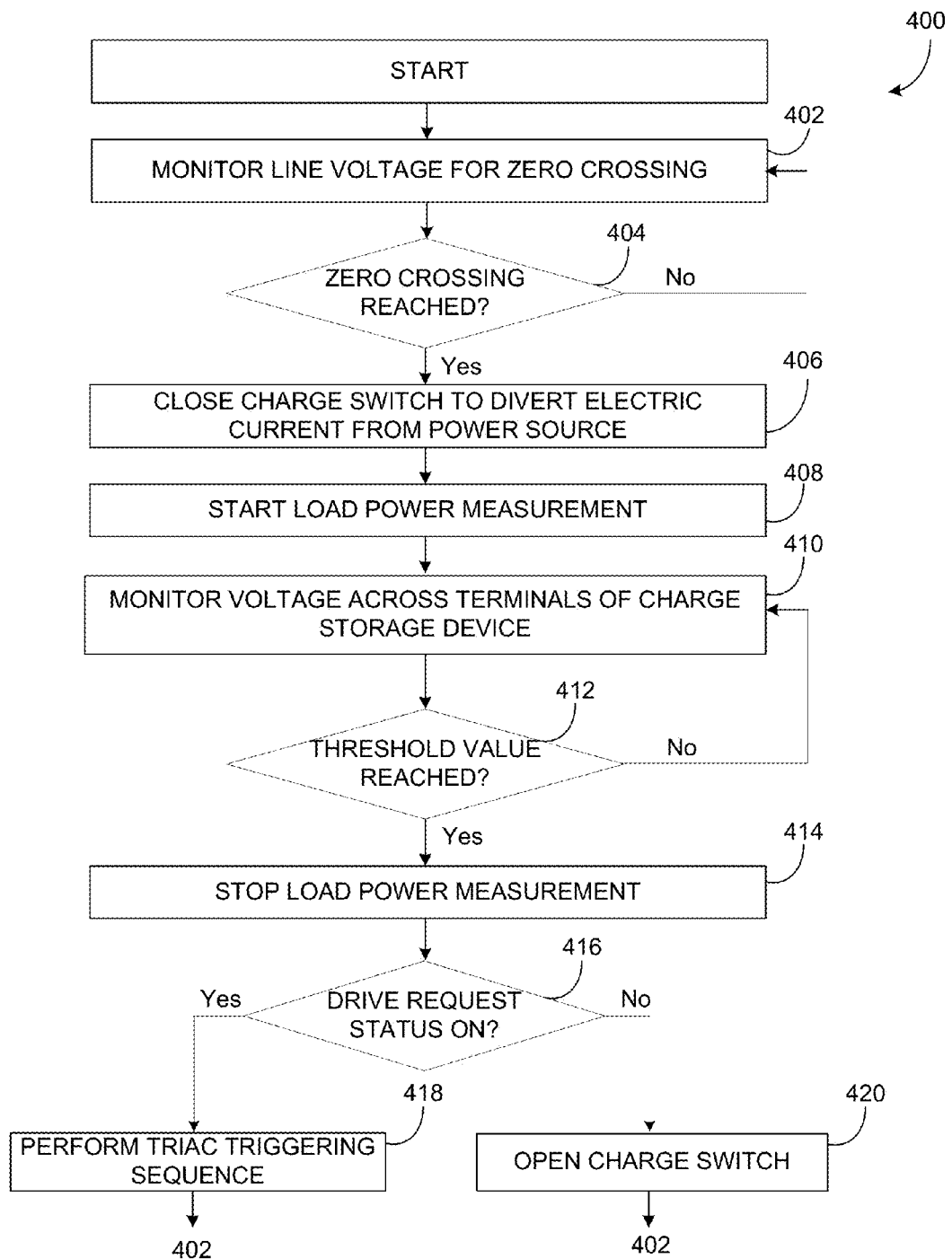
FIG. 6 is a flowchart of a method for controlling a supply of power to a load, in accordance with an illustrative embodiment of the present invention.

Referring now to FIG. 6, a method 400 for controlling a supply of power from a power source to a load will now be described. The method 400 comprises the step 402 of monitoring the line voltage for the zero crossing. If the zero crossing is not detected at step 404, the method 400 flow back to step 402. Otherwise, if the zero crossing is detected at step 404, a charge switch (reference 132 FIG. 3) is closed at step 406 for diverting electrical current away from the power source. The next step 408 is then to start load power measurement. For this purpose, a timer is started for measuring the charging time of a charge storage device (reference 134 in FIG. 3), as discussed herein above. Upon the electrical current being diverted from the power source, an electrical charge is indeed stored in the charge storage device 134. The voltage across the charge storage device is then monitored at step 410 and compared at step 412 to a threshold value. If it is determined at step 412 that the threshold value has been reached, the next step 414 may be to stop the load power measurement, i.e. stop the timer. The next step 416 is then to determine whether the drive request status is "on", i.e. whether the drive request signal discussed above with reference to FIG. 4 is activated. If this is the case, the TRIAC triggering sequence is performed at step 418. Otherwise, if the drive request status is "off", i.e. no drive request signal has been received, the CC drive signal discussed above may be deactivated to open the charge switch at step 420. After execution of steps 418 and 420, the method 400 may then flow back to the step 402 of monitoring the line voltage for zero crossing.

Figure 7:
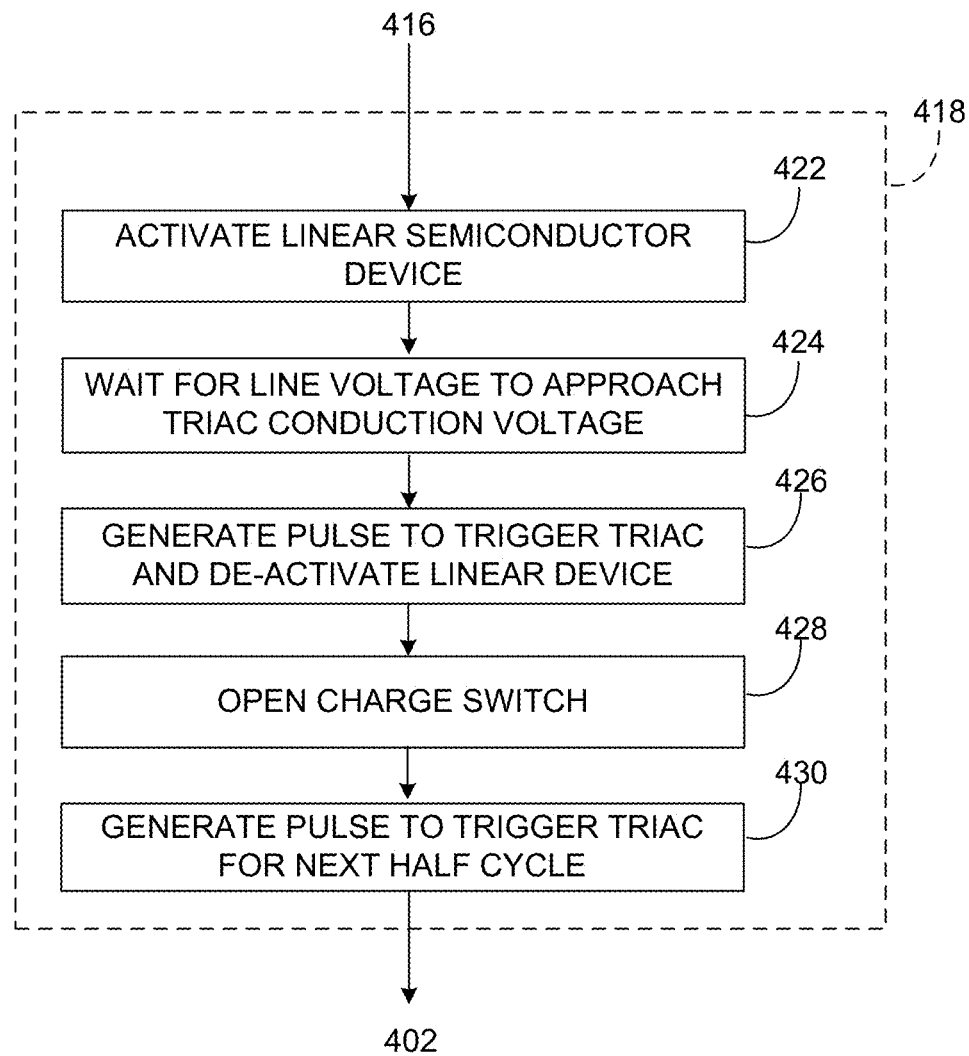
FIG. 7 is a flowchart of the step of FIG. 6 of performing the TRIAC triggering sequence.

Referring now to FIG. 7, the step 418 of performing the triggering sequence of the TRIAC (reference 122 in FIG. 3) illustratively comprises activating the linear semiconductor device (reference 128 in FIG. 3), e.g. the MOSFET (reference 130 in FIG. 3), at step 422. As discussed above with reference to FIG. 3, this causes the linear semiconductor device to controllably lower the line voltage towards zero volts. Once the linear semiconductor device has been activated at step 422, the timing control circuit (reference 144 in FIG. 3) then waits at step 424 for the line voltage to approach the TRIAC conduction voltage. In other words, the timing control circuit 144 waits the amount of time required for the linear semiconductor to drag the line voltage close to zero volts. It should be understood that the line voltage may alternatively be monitored for detecting when the line voltage is close to the conduction voltage, i.e. close to zero volts. Once it is determined at step 424 that the line voltage approaches zero volts, a first pulse is generated at step 426 to trigger the TRIAC, thereby diverting the current that was flowing in the linear semiconductor towards the TRIAC. The linear semiconductor device is then de-activated at step 426. The next step 428 may then be to de-activate the CC drive signal to open the charge switch. A second pulse is then generated at step 430 to trigger the TRIAC for the next half cycle in order to maintain a conduction state of the TRIAC. In particular, the second pulse is applied on the TRIAC's gate about half a cycle after the zero-crossing is detected at step 404.

The embodiments of the invention described above are intended to be exemplary only. The scope of the invention is therefore intended to be limited solely by the scope of the appended claims.

The invention claimed is:

1. A control device for controlling a supply of power from an AC power source to a load, the power source supplying a line voltage having a plurality of repeating cycles, the control device comprising:

a first switch arranged in series electrical connection between the power source and the load, the first switch having a first state in which the first switch conducts electrical current and a second state in which the first switch is not conducting; and a power stealing circuit arranged in parallel electrical connection to the first switch and comprising a charge storage, a second switch connected between a first terminal of the first switch and the charge storage device, and a semiconductor device, the power stealing circuit for:

detecting a zero crossing of the line voltage occurring at a beginning of each one of the plurality of cycles, at the zero crossing, directing through the second switch and towards the charge storage device an electrical current flowing through the load with the first switch in the second state, monitoring a voltage across terminals of the charge storage device and comparing the voltage across terminals of the charge storage device to a threshold value, if the voltage across terminals of the charge storage device reaches the threshold value, causing activation of the semiconductor device, the semiconductor device, when activated, bringing a voltage across terminals of the first switch towards zero volts with a predetermined rate, and bringing the first switch to the first state once the voltage across terminals of the first switch approaches zero volts.

2. The control device of claim 1, wherein the charge storage device stores therein an electrical charge when the electrical current is directed thereto and further wherein the control device comprises a control unit adapted to determine a charging time of the charge storage device and to estimate therefrom a power consumed by the load on the basis of the charging time and a resistance of the load.

3. The control device of claim 2, wherein the power stealing circuit comprises a voltage detector for monitoring the voltage across terminals of the charge storage device and causing the control unit to output a control signal for activating the semiconductor device when the voltage across terminals of the charge storage device has reach the threshold value.

4. The control device of claim 3, wherein the semiconductor device comprises a MOSFET for, when activated, bringing the voltage across terminals of the first switch towards zero volts for lowering a voltage drop from the voltage across terminals of the first switch to a conduction voltage of the first switch, thereby lowering a level of interference generated upon the first switch being brought to the first state.

5. The control device of claim 4, wherein the control unit waits a predetermined time delay for the line voltage to approach zero volts prior to applying a first pulse on a gate terminal of the first switch to bring the first switch into the first state.

6. The control device of claim 4, wherein the power stealing circuit further comprises a zero crossing detector for monitoring the line voltage, and, if the line voltage approaches zero volts, for causing the control unit to apply a first pulse on a gate terminal of the first switch to bring the first switch into the first state.

7. The control device of claim 6, wherein, a half-cycle after the line voltage approaches zero volts, the control unit applies a second pulse on the gate terminal to maintain the conduction of the switch.

8. The control device of claim 7, wherein the control unit generates the first and second pulse using at least a portion of the electrical charge stored in the charge storage device.

9. The control device of claim 1, wherein the control device comprises a two-wire line voltage thermostat adapted to receive one or more radio-frequency signals indicative of instructions to operate at least one of the load and the thermostat and adapted to transmit one or more radio-frequency signals indicative of an operating condition of at least one of the load and the thermostat in response to the instructions.

10. A power stealing circuit for a control device controlling a supply of power from an AC power source to a load, the power source supplying a line voltage having a plurality of repeating cycles, the control device comprising a first switch arranged in series electrical connection between the power source and the load and having a first state in which the first switch conducts electrical current and a second state in which the first switch is not conducting, the power stealing circuit comprising:

a charge storage device arranged in parallel electrical connection with the first switch;

a second switch connected between a first terminal of the first switch and the charge storage device, the second switch for, at a zero crossing of the line voltage occurring at a beginning of each one of the plurality of cycles, directing towards the charge storage device an electrical current flowing through the load with the first switch in the second state; and a semiconductor device arranged in parallel electrical connection with the first switch, the semiconductor device being activated when a voltage across terminals of the charge storage device reaches a threshold value, the semiconductor device, when activated, bringing a voltage across terminals of the first switch towards zero volts with a predetermined rate before the first switch is brought to the first state.

11. The power stealing circuit of claim 10, further comprising a voltage detector for monitoring a second voltage across terminals of the charge storage device, and, if the voltage detector determines that the second voltage has reached a threshold value, for causing the semiconductor device to be activated.

12. The power stealing circuit of claim 11, wherein the semiconductor device comprises a MOSFET for, when activated, bringing the voltage across terminals of the first switch towards zero volts for lowering a voltage drop across terminal of the first switch to a conduction voltage of the first switch, thereby lowering a level of interference generated upon the first switch being brought to the first state.

13. The power stealing circuit of claim 12, further comprising a control unit adapted to wait a predetermined time delay subsequent to activation of the semiconductor device for the line voltage to approach zero volts prior to applying a first pulse on a gate terminal of the first switch to bring the first switch into conduction.

14. The power stealing circuit of claim 12, further comprising a zero crossing detector for monitoring the line voltage and a control unit in communication with the zero crossing detector, wherein, if the line voltage approaches zero volts, the zero crossing detector causes the control unit to apply a first pulse on a gate terminal of the first switch to bring the first switch into conduction.

15. The power stealing circuit of claim 14, wherein, a half-cycle after the line voltage approaches zero volts, the control unit applies a second pulse on the gate terminal of the first switch to maintain the conduction of the first switch.

16. The power stealing circuit of claim 15, wherein the charge storage device stores therein an electrical charge upon the electrical current being directed thereto, and further wherein the control unit generates the first and the second pulse using at least a portion of the electrical charge stored in the charge storage device.

17. The power stealing circuit of claim 16, wherein the control unit is adapted to determine a charging time of the charge storage device and to estimate, on the basis of the charging time and a resistance of the load, a power consumed by the load.

18. A method for controlling a supply of power from an AC power source to a load having a first switch arranged in series electrical connection therebetween, the first switch having a first state in which the first switch conducts electrical current and a second state in which the first switch is not conducting, the method comprising:

directing, through a second switch, an electrical current flowing through the load with the first switch in the second state towards a charge storage device arranged in parallel electrical connection with the first switch, the second switch connected between a first terminal of the first switch and the charge storage device;

comparing a voltage across terminals of the charge storage device to a threshold value;

when the voltage across terminals of the charge storage device reaches the threshold value, outputting a control signal for activating a semiconductor device arranged in parallel electrical connection to the first switch, the semiconductor device, when activated, controllably bringing towards zero volts a voltage across terminals of the first switch; and applying, when a line voltage supplied by the power source approaches zero volts, a first pulse on a gate terminal of the first switch to trigger the first switch, thereby bringing the first switch to the first state.

19. The method of claim 18, further comprising, prior to applying the first pulse, one of monitoring the line voltage for detecting when the line voltage approaches zero volts and waiting a predetermined time delay, subsequent to activation of the semiconductor device, for the line voltage to approach zero volts.

20. The method of claim 19, further comprising, a half-cycle after the line voltage reaches zero volts, applying a second pulse on the gate terminal of the first switch to maintain a conduction of the first switch.

21. The method of claim 20, further comprising, storing an electrical charge in the charge storage device upon the electrical current being directed towards the charge storage device, determining a charging time of the charge storage device, and estimating, on the basis of the charging time and a resistance of the load, a power consumed by the load.

22. A two-wire line voltage thermostat for controlling a supply of power from an AC power source to a load, the power source supplying a line voltage having a plurality of repeating cycles, the thermostat comprising:

a first switch arranged in series electrical connection between the power source and the load, the first switch having a first state in which the first switch conducts electrical current and a second state in which the first switch is not conducting;

a power stealing circuit arranged in parallel electrical connection to the first switch and comprising a charge storage device, a second switch connected between a first terminal of the first switch and the charge storage device, and a semiconductor device, the power stealing circuit for:

at a zero crossing of the line voltage occurring at a beginning of each one of the plurality of cycles, directing through the second switch and towards the charge storage device an electrical current flowing through the load with the first switch in the second state, if a voltage across terminals of the charge storage device reaches a threshold value, causing activation of the semiconductor device, the semiconductor device, when activated, bringing a voltage across terminals of the first switch towards zero volts with a predetermined rate, and bringing the first switch to the first state once the voltage across terminals of the first switch approaches zero volts; and a communications module adapted to receive one or more input radio-frequency signals indicative of instructions to operate at least one of the load and the thermostat.

23. The thermostat of claim 22, wherein the communications module is adapted to receive the one or more input radio-frequency signals from one or more remote devices and to transmit to the one or more remote devices one or more output radio-frequency signals indicative of an operating condition of the at least one of the load and the thermostat in response to the instructions.

* * * * *